(12) United States Patent
Allen

(10) Patent No.: US 12,061,271 B2
(45) Date of Patent: Aug. 13, 2024

(54) PERIODICALLY VARYING FREQUENCIES FOR ASSURED TIME TRANSFER

(71) Applicant: The Aerospace Corporation, El Segundo, CA (US)

(72) Inventor: David W. Allen, Fairfax, VA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 387 days.

(21) Appl. No.: 17/529,657

(22) Filed: Nov. 18, 2021

(65) Prior Publication Data
US 2023/0152754 A1 May 18, 2023

(51) Int. Cl.
G01S 19/21 (2010.01)
G04R 20/02 (2013.01)

(52) U.S. Cl.
CPC ............ G01S 19/215 (2013.01); G04R 20/02 (2013.01)

(58) Field of Classification Search
CPC ............ G01S 19/02; G01S 19/21–215; G04R 20/02–06; H04K 3/90
See application file for complete search history.

(56) References Cited

U.S. PATENT DOCUMENTS

| 6,741,633 | B1 * | 5/2004 | Cangiani | G01S 19/02 375/132 |
| 10,732,294 | B1 * | 8/2020 | Hall | G01S 19/02 |
| 10,884,132 | B1 * | 1/2021 | Judd | G01S 19/42 |
| 11,630,424 | B2 * | 4/2023 | Bryson | H02J 1/00 700/286 |
| 2008/0059059 | A1 * | 3/2008 | Cohen | G01S 19/10 342/357.44 |
| 2009/0322598 | A1 * | 12/2009 | Fly | G01S 19/20 342/357.48 |
| 2016/0370470 | A1 * | 12/2016 | Mabuchi | G07B 15/063 |
| 2022/0221589 | A1 * | 7/2022 | Elgersma | G01S 19/21 |

* cited by examiner

Primary Examiner — Cassi J Galt
(74) Attorney, Agent, or Firm — LeonardPatel PC

(57) ABSTRACT

A system and method for periodically varying a center frequency for assured time transfer in order to securely transfer a signal from a source to a receiver, without adding additional encryption to signal.

22 Claims, 3 Drawing Sheets

200

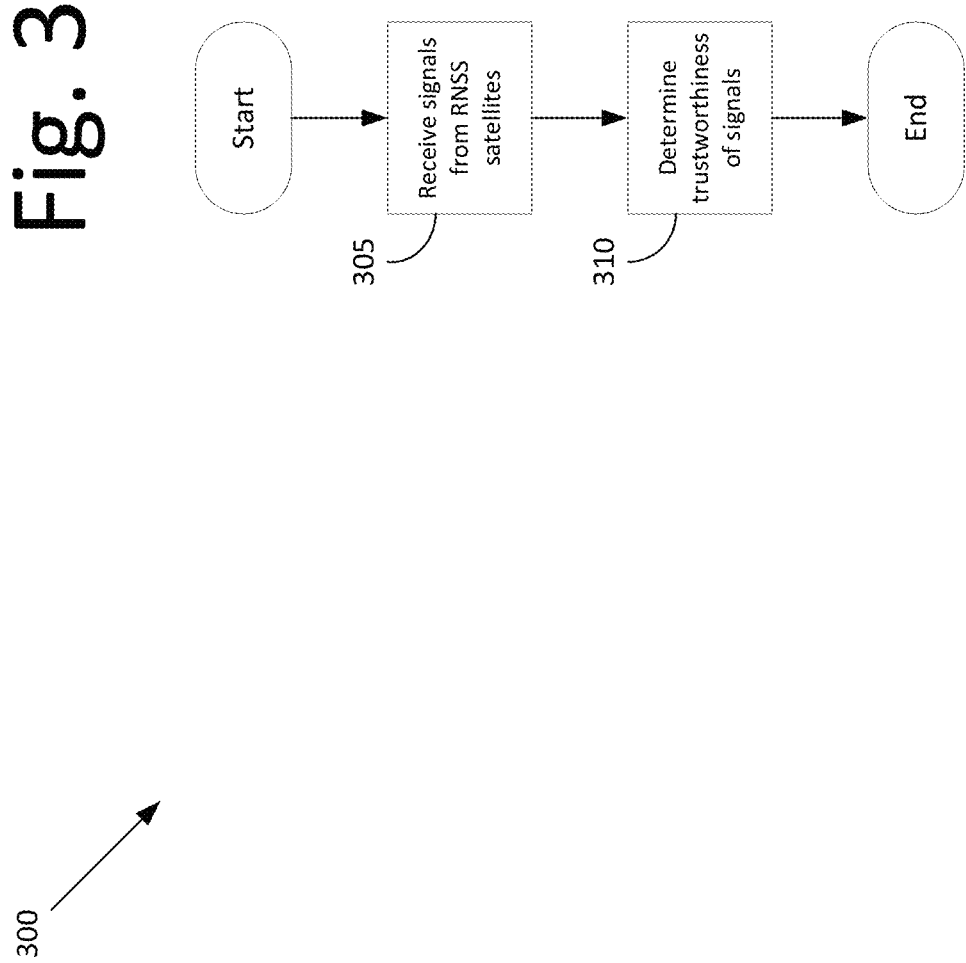

PERIODICALLY VARYING FREQUENCIES FOR ASSURED TIME TRANSFER

FIELD

The present invention relates to secured signal broadcasting, and more particularly, to periodically varying a center frequency for assured time transfer.

BACKGROUND

Radio Navigation Satellite Systems (RNSS), such as Global positioning system (GPS), use satellites to perform one-way time transfer. One-way time transfer requires taking information from multiple transmitters (satellites in the case of RNSS) and using information about the transmitters' time and location to generate an estimate of time on board a receiver. Usually, this also includes determining the location of the receiver if it is not already known. For example, let's assume there are four GPS satellites, each of which have a clock. In this assumption, a RNSS receiver may receive a signal from one or more of the RNSS satellites. The clocks are generally cheap in monetary aspects, and measures the time delay between the time at the satellite and when the receiver receives the signal.

Some RNSS signals, for example GPS C/A for coarse acquisition, are unencrypted. This leads to spoofing, i.e., an unauthorized signal is received and processed by the RNSS receiver. Once the RNSS receiver processes the unauthorized signal, the source, which may be another unauthorized satellite or terrestrial transmitter, has the ability to manipulate the RNSS receiver creating security concerns, ranging from consumer applications to military applications.

Currently, protected position service is used by the military, for example. With the protected position service, an encrypted key is given the receiver in advance, and the RNSS receiver uses this encrypted key each time an encrypted signal is received from the RNSS satellite.

However, with this technique, the significant effort must be spent on providing appropriate protection for the encryption in order to protect it from being decoded. Accordingly, an improved assurance technique may be beneficial, i.e., provide the receiver with a trusted source signal without encryption.

SUMMARY

Certain embodiments of the present invention may provide solutions to the problems and needs in the art that have not yet been fully identified, appreciated, or solved by current time transfer technologies. For example, some embodiments of the present invention pertain to a method of periodically varying frequencies for assured time transfer in order to securely transfer a signal from a source to a receiver.

In one embodiment, a system for periodically varying frequencies for assure time transfer includes a plurality of RNSS satellites, each of which are configured to broadcast a signal to a receiver. The signal transmitted by each of the plurality of RNSS satellites includes a center frequency varied by a predetermined MHz with a corresponding time period. The system also includes the receiver is configured to receive the signal from each of the plurality of RNSS satellites and form a timing solution to determine if the signal received from each of the plurality of RNSS satellites is trustworthy.

In another embodiment, a method for periodically varying frequencies for assure time transfer includes receiving, by a receiver, a plurality of broadcasted signal from a plurality of RNSS satellites. Each of the plurality of broadcasted signals includes a center frequency varied by a predetermined MHz with a corresponding time period. The method also includes forming, by the receiver, a timing solution to determine if each of the plurality of broadcasted signals are trustworthy.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a flow diagram illustrating a method for periodically varying the center frequencies for assured time transfer, according to an embodiment of the present invention.

DETAILED DESCRIPTION OF THE EMBODIMENTS

Figure 1:
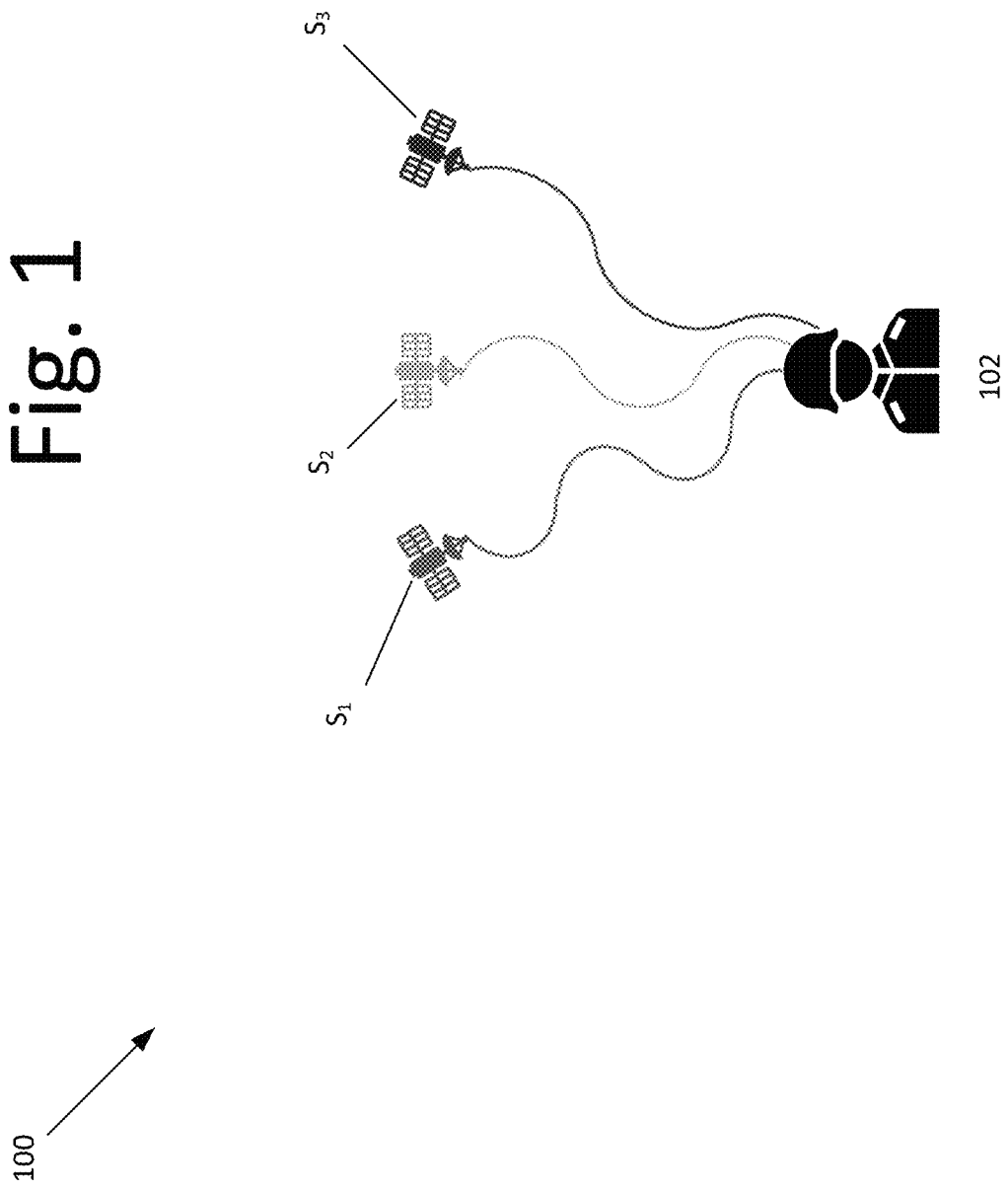
FIG. 1 is a diagram illustrating a system configured for a user on the ground to receive signals from three satellites $S_1$, $S_2$, $S_3$ simultaneously, according to an embodiment of the present invention.

Some embodiments of the present invention pertain to a method of periodically varying the center frequency for assured time transfer in order to securely transfer a signal from a source (e.g., a RNSS satellite) to a receiver (e.g., a RNSS receiver). Rather than adding encryption to signal, some embodiments use the physical properties of the signal to add a layer of encryption.

Typically, the source may broadcast a constant center frequency. In one example, GPS L1 C/A code is broadcast at a center frequency of 1575.42 MHz. The GPS receiver can track through small variations of center frequency, such as those caused by Doppler shifts. Some embodiments intelligently vary this center frequency from each source to create a mapping between combinations of center frequencies and time. The primary requirement on this mapping is that it is a diffeomorphism, which assures that every time produces a unique combination of frequencies allowing a receiver alternative to predict center frequencies of received signals at any given time, or to compute time based on the center frequencies of received signals, depending on what is needed at the time. The time computed from the combination of center frequencies provides an independent measurement of time to assure the solution that the traditional acquired RNSS signal is being received.

It should be appreciated that with this technique spoofing is difficult, because the spoofing source would not be aware of the varying technique. For example, even if the spoofing source was aware of the specifics of the varying technique, the exact position and velocity of the receiver creates a unique set of frequency shifts that the spoofing source would need to account for in addition to the relative velocity between the receiver and the spoofing source.

In an embodiment, the center frequency of the first signal is varied. For example, the center frequency of the first signal is varied by 1 MHz with a period of 50 seconds. Next, the center frequency of the second signal is also varied, e.g., by 1 MHz with a period of 45 seconds, and the center frequency of the third signal is also varied, e.g., by 1 MHz with a period of 40 seconds. These signals with the varied center frequencies are being broadcasted by the source.

The receiver may track the signals and create a position and timing solution. For example, the GPS satellites broadcast their position and time information, which can be used by a GPS receiver to determine GPS receiver's position and time. In an embodiment, the center frequencies of the RNSS satellites' broadcast are varied allowing the receiver to use the measurements of the center frequency to measure time independently of the broadcasts. This provides an independent way to verify that the timing information received in the broadcast via the navigation data messages or other information encoded on the signal, e.g., via a spreading sequence, matches the timing information conveyed by the variation of the center frequencies in the embodiment.

In other words, when the signals from the RNSS satellites are tracked, measurement of the varied center frequency for each of the signals is performed by the RNSS receiver. Using the combination of the varied center frequencies, time can be computed, i.e., the combination of the varied center frequencies are mapped to a specific time. In general, RNSS receivers use a Kalman filter, non-linear least squares filter, or batch filter to compute a position and timing solution. In these embodiments, the receiver has an additional processing step used to resolve the combination of received center frequencies into a timing solution. This processing step uses the combination of the received center frequencies to produce a time estimate for each satellite. Depending on the specific embodiment, the receiver could alternatively use this time information to compute a new navigation solution or verify that the timing information obtained from the center frequency matches the timing information in the navigation messages.

FIG. 1 is a diagram illustrating a system 100 configured for a user on the ground to receive signals from three satellites $S_1$, $S_2$, $S_3$ simultaneously, according to an embodiment of the present invention. Although FIG. 1 shows three satellites $S_1$, $S_2$, and $S_3$, there may be more or less satellites. In this embodiment, sources $S_1$, $S_2$, and $S_3$ broadcast a signal to receiver 102. Each signal that is being broadcasted is has a center frequency, all of which are mapped to a specific time. When a distant receiver takes these center frequencies in combination, the receiver unambiguously (within the shortest common period of the variations) determines the time of broadcast. Depending on the mapping selected, the specific algorithm for determining the time of broadcast can vary. For example, if the inverse of the mapping from time to combinations of center frequencies is known, the algorithm computes the time using the combination of center frequencies. In other embodiments, the algorithm uses a table look-up or some other numerical method.

In a table look-up, the receiver generates or is provided with a list of times and corresponding combinations of center frequencies. The receiver then takes the received combination of the center frequencies, compensated for Doppler shift and time delays, and finds the closest match in the table, possibly with some interpolation or resampling technique to balance fidelity and memory allocation. In this embodiment, the receiver uses either the inverse mapping or another algorithm to take the combination of the received center frequencies and compute the time of broadcast of those signals.

According to an embodiment, the center frequencies provide an independent technique for broadcasting timing information. This additional technique determines whether a received signal is trustworthy. For example, suppose a constellation was broadcasting signals in the same structure as GPS, with timing information embedded in the spreading sequence and data messages, but with periodically varying center frequencies as described in an embodiment. The receiver may form a position and timing solution as is traditionally done with GPS, but additionally forms a timing solution using only the center frequencies using one of the previously discussed techniques. Using these two independently derived timing solutions, the receiver verifies that two timing solutions match, which indicate that the traditionally calculated timing solution is from the same source as the timing solution generated by the embodiment. If the solutions do not match, the embodiment determines which of the received signals is not trustworthy and excises it from the traditionally computed solution.

Figure 2:
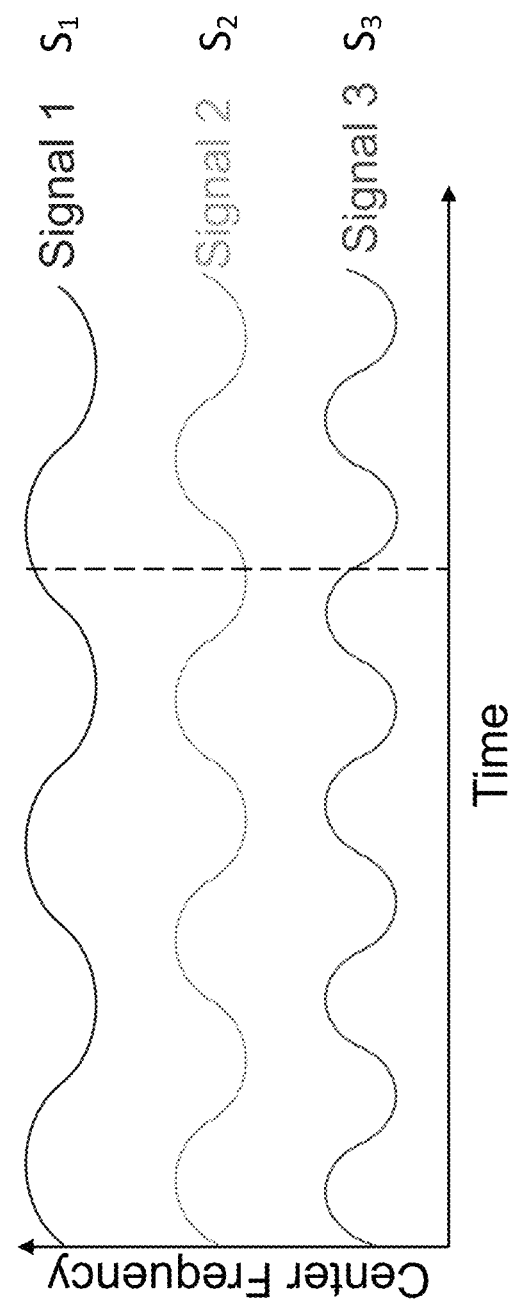
FIG. 2 is a graph illustrating a notional concept of operations, according to an embodiment of the present invention.

FIG. 2 is a graph 200 illustrating a notional concept of operations, according to an embodiment of the present invention. In graph 200, each satellite is broadcasting a signal $S_1$, $S_2$, and $S_3$, each of which have a center frequency in some periodic manner. In this embodiment, a receiver observes the center frequency of signals $S_1$, $S_2$, $S_3$ broadcasted by each satellite. Using these center frequencies, the receiver determines the time that each satellite broadcasted the corresponding signal $S_1$, $S_2$, $S_3$ that the receiver is currently receiving. If the receiver is provided with position information of the broadcasting satellite, either via the broadcast signal or another method, then the receiver uses this information to determine the range to the satellites via the time difference of arrival while computing a position and time solution through trilateration. The time difference of arrival, i.e., the time it takes for the signal to travel from the transmitter to the receiver, is proportional to the distance between the transmitter and receiver. Ignoring relativistic impacts and path delays as well as other practical concerns, the distance is simply the travel time multiplied by the speed of light. Thus, knowing the time difference of arrival provides the distance to a satellite. This distance is used by a receiver to compute a position solution using an algorithm such as a Kalman filter. A Kalman filter takes an initial estimate of position and uses measurements (in this case the distances to the transmitter) to update that estimate. The Kalman filter may then predict a new estimate using a model of the motion of the receiver and repeats the process with a new set of measurements. Alternatively, a batch filter takes in numerous distance measurements spaced through time. A batch filter may use these measurements, coupled with a model for the motion of the receiver, to produce an estimate of the trajectory of the receiver through time. Additional algorithms, such as a weighted least-squares filter, may function in similar ways.

FIG. 3 is a flow diagram illustrating a method 300 for periodically varying the center frequencies for assured time transfer, according to an embodiment of the present invention. In some embodiments, method 300 includes receiving at 305, by a receiver, a plurality of broadcasted signal from a plurality of RNSS satellites. In these embodiments, each of the plurality of broadcasted signals comprise a center frequency varied by a predetermined MHz with a corresponding time period. Method 300 also includes forming at 310 a timing solution to determine if each of the plurality of broadcasted signals are trustworthy.

In some embodiments, a system for periodically varying frequencies for assure time transfer includes a plurality of RNSS satellites, each of which are configured to broadcast a signal to a receiver. The signal transmitted by each of the plurality of RNSS satellites includes a center frequency varied by a predetermined MHz with a corresponding time period. The receiver is configured to receive the signal from each of the plurality of RNSS satellites and form a timing solution to determine if the signal received from each of the plurality of RNSS satellites is trustworthy.

In some embodiments, the center frequency of the broadcasted signal is mapped to a specific time, and the receiver is configured to use the center frequency in combination with a mapped time of the center frequency to determine a time of broadcast.

In some further embodiments, the receiver is further configured to utilize an algorithm to compute time using a combination of center frequencies, and is configured to access a look-up table. The look-up table in certain embodiments includes a list of times and a corresponding combination of center frequencies. The receiver is further configured to use the received combination of the center frequencies, compensated for Doppler shift and time delays, and identify closest match in the look-up table.

In some additional embodiments, the receiver uses an inverse mapping or another algorithm to take the combination of the received center frequencies and compute the time of broadcast of each broadcasted signal, and may form a first position and timing solution and form a second timing solution using only center frequencies of each broadcasted signal. The receiver may also verify that the first position and timing solution match with the second timing solution, indicating that the first position and timing solution is from a same source.

In another embodiment, a method for periodically varying frequencies for assure time transfer includes receiving, by a receiver, a plurality of broadcasted signal from a plurality of RNSS satellites. Each of the plurality of broadcasted signals includes a center frequency varied by a predetermined MHz with a corresponding time period. The method also includes forming, by the receiver, a timing solution to determine if each of the plurality of broadcasted signals are trustworthy.

In these embodiments, the center frequency for each of the plurality of broadcasted signals are mapped to a specific time. The method uses the center frequency for each of the plurality of broadcasted signals in combination with a mapped time of the center frequency to determine a time of broadcast.

Also, in these embodiments, the method includes utilizing an algorithm to compute time using a combination of center frequencies received by the receiver.

In certain embodiments, the method includes accessing a look-up table, where the look-up table includes a list of times and a corresponding combination of center frequencies. The method also includes using the received combination of the center frequencies, compensated for Doppler shift and time delays, and identifying closest match in the look-up table.

The method in some embodiments includes using an inverse mapping or another algorithm to take the combination of the received center frequencies and computing the time of broadcast of each broadcasted signal.

In yet some additional embodiments, the method includes forming a first position and timing solution and forming a second timing solution using only center frequencies of each broadcasted signal. The method includes verifying that first position and timing solution match with the second timing solution, indicating that first position and timing solution is from a same source.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for periodically varying frequencies for assured time transfer, comprising:
   a receiver; and
   a plurality of radio navigation satellite system (RNSS) satellites, each of which are configured to broadcast a signal to the receiver, wherein the signal transmitted by each of the plurality of RNSS satellites comprises a center frequency varied on a predetermined cycle with a corresponding time period, and the receiver is configured to receive the signal from each of the plurality of RNSS satellites and form a timing solution, using variations in the center frequency, to determine if the signal received from each of the plurality of RNSS satellites is trustworthy.

2. The system of claim 1, wherein the variations in the center frequency of each satellite are mapped to specific times.

3. The system of claim 1, wherein the receiver is further configured to use the center frequency in combination with a mapped time of the center frequency to determine a time of broadcast.

4. The system of claim 3, wherein the receiver is further configured to utilize an algorithm to compute the time of broadcast using a combination of center frequencies.

5. The system of claim 3, wherein the receiver is further configured to access a look-up table, wherein the look-up table comprises a list of broadcast times and a corresponding combination of center frequencies, and uses the corresponding combination of the center frequencies, compensated for Doppler shift and time delays, and identifies a closest match in the look-up table.

6. The system of claim 5, wherein the receiver is further configured to use an inverse mapping to take the corresponding combination of the center frequencies and compute the time of broadcast for each broadcasted signal.

7. The system of claim 3, wherein the receiver is further configured to form a first position and a first timing solution and form a second position and a second timing solution using only center frequencies of each broadcasted signal.

8. The system of claim 7, wherein the receiver is further configured to verify that the first position and timing solution match with the second timing solution, indicating that the first position and timing solution is from a same source.

9. A method for periodically varying frequencies for assured time transfer, comprising:

receiving, by a receiver, a plurality of broadcasted signal from a plurality of radio navigation satellite system (RNSS) satellites, wherein the each of the plurality of broadcasted signals comprise a center frequency varied on a predetermined cycle with a corresponding time period; and forming, by the receiver, a timing solution, using variations in the center frequency, to determine if each of the plurality of broadcasted signals are trustworthy.

10. The method of claim 9, wherein the variations in the center frequency is mapped to specific times.

11. The method of claim 9, further comprising:

using the center frequency for each of the plurality of broadcasted signals in combination with a mapped time of the center frequency to determine a time of broadcast.

12. The method of claim 11, further comprising:

utilizing an algorithm to compute the times of broadcast using a combination of center frequencies received by the receiver.

13. The method of claim 11, further comprising:

accessing a look-up table, wherein the look-up table comprises a list of broadcast times and a corresponding combination of center frequencies, and using the corresponding combination of the center frequencies, compensated for Doppler shift and time delays, and identifying a closest match in the look-up table.

14. The method of claim 13, further comprising:

using an inverse mapping to take the corresponding combination of the center frequencies and computing the time of broadcast for each broadcasted signal.

15. The method of claim 11, further comprising:

forming a first position and a first timing solution and forming a second position and a second timing solution using only center frequencies of each broadcasted signal.

16. The method of claim 15, further comprising:

verifying that the first position and timing solution match with the second timing solution, indicating that the first position and timing solution is from a same source.

17. A system for periodically varying frequencies for assured time transfer, comprising:

a receiver; and a plurality of radio navigation satellite system (RNSS) satellites, each of which are configured to broadcast a signal to the receiver, wherein the signal transmitted by each of the plurality of RNSS satellites comprises a center frequency varied on a predetermined cycle with a corresponding time period, the center frequency being mapped to a specific time, the receiver is configured to receive the signal from each of the plurality of RNSS satellites and form a timing solution to determine if the signal received from each of the plurality of RNSS satellites is trustworthy, and use the variations in the center frequency in combination with a mapped time of the center frequency to determine a time of broadcast.

18. The system of claim 17, wherein the receiver is further configured to utilize an algorithm to compute the time of broadcast using a combination of center frequencies.

19. The system of claim 17, wherein the receiver is further configured to access a look-up table, wherein the look-up table comprises a list of broadcast times and a corresponding combination of center frequencies, and uses the corresponding combination of the center frequencies, compensated for Doppler shift and time delays, and identifies a closest match in the look-up table.

20. The system of claim 19, wherein the receiver is further configured to use an inverse mapping to take the corresponding combination of the center frequencies and compute the time of broadcast for each broadcasted signal.

21. The system of claim 17, wherein the receiver is further configured to form a first position and a first timing solution and form a second position and a second timing solution using only center frequencies of each broadcasted signal.

22. The system of claim 21, wherein the receiver is further configured to verify that first position and timing solution match with the second timing solution, indicating that first position and timing solution is from a same source.

* * * * *